(12) United States Patent
Daito et al.

(10) Patent No.: US 10,451,508 B2
(45) Date of Patent: Oct. 22, 2019

(54) PRESSURE TRANSDUCER AND METHOD FOR FABRICATING THE SAME

(71) Applicant: Schlumberger Technology Corporation, Sugar Land, TX (US)

(72) Inventors: Shigeo Daito, Yokohama (JP);
Takenori Motoki, Yokohama (JP);
Noriyuki Matsumoto, Yokohama (JP);
Martine Hori, Sagamihara (JP)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 70 days.

(21) Appl. No.: 15/607,747

(22) Filed: May 30, 2017

(65) Prior Publication Data

US 2017/0350780 A1    Dec. 7, 2017

Related U.S. Application Data

(60) Provisional application No. 62/345,051, filed on Jun. 3, 2016.

(51) Int. Cl.
*G01L 9/00* (2006.01)
*G01L 9/08* (2006.01)
*G01L 23/10* (2006.01)

(52) U.S. Cl.
CPC ............... *G01L 9/08* (2013.01); *G01L 9/008* (2013.01); *G01L 9/0022* (2013.01); *G01L 9/0052* (2013.01); *G01L 9/0058* (2013.01); *G01L 23/10* (2013.01); *G01L 2009/0066* (2013.01)

(58) Field of Classification Search
CPC ......... G01L 9/00; G01L 9/008; G01L 9/0022; G01L 9/0052; G01L 9/0058; G01L 9/06; G01L 9/08; G01L 11/00; G01L 23/10; G01L 2009/0066

See application file for complete search history.

(56) References Cited

U.S. PATENT DOCUMENTS

| 3,561,832 | A | * | 2/1971 | Karrer et al. ........... E21B 47/06 310/338 |
|---|---|---|---|---|
| 3,617,780 | A | | 11/1971 | Benjaminson |
| 4,419,600 | A | | 12/1983 | Sinha |
| 4,547,691 | A | | 10/1985 | Valdois et al. |
| 5,394,345 | A | | 2/1995 | Berard et al. |
| 6,111,340 | A | | 8/2000 | Sinha et al. |
| 7,334,483 | B2 | | 2/2008 | Sato et al. |
| 8,136,406 | B2 | | 3/2012 | Sato et al. |

(Continued)

FOREIGN PATENT DOCUMENTS

| JP | 2010046696 A | 3/2010 |
|---|---|---|
| JP | 2011235300 A | 11/2011 |
| JP | 2012223792 A | 11/2012 |

OTHER PUBLICATIONS

"Direct Bonded Quartz Resonators" Vallin et al., IEEE, 2001.*

(Continued)

*Primary Examiner* — Nguyen Q. Ha
(74) *Attorney, Agent, or Firm* — Eileen Pape

(57) ABSTRACT

A pressure transducer comprises a housing including a body section and at least one end cap at one end of the body section, which are made of piezoelectric crystal, and a piezoelectric resonator in the housing. The body section and the end cap are bonded by an atomic diffusion bonding method.

18 Claims, 10 Drawing Sheets

(56) References Cited

U.S. PATENT DOCUMENTS

| | | |
|---|---|---|
| 9,151,960 B2 | 10/2015 | Awanohara |
| 9,209,781 B2 | 12/2015 | Kubota et al. |
| 9,257,619 B2 | 2/2016 | Ichikawa et al. |
| 2009/0009036 A1 | 1/2009 | Matsumoto et al. |
| 2016/0093773 A1 | 3/2016 | Sano |

OTHER PUBLICATIONS

Brainerd et al., Standard on Piezoelectric Crystals, 1949, published in the Proceedings of the Institute of Radio Engineers, New York, Dec. 1949 (18 pages).

* cited by examiner

PRESSURE TRANSDUCER AND METHOD FOR FABRICATING THE SAME

RELATED APPLICATIONS

The present document is based on and claims priority to U.S. Provisional Application Ser. No. 62/345,051, filed Jun. 3, 2016, entitled "Pressure Transducer and Method for Fabricating the Same" to Shigeo Daito, et al., which is incorporated herein by reference in its entirety.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art. The following descriptions and examples are not admitted to be prior art by virtue of their inclusion in this section.

The present disclosure relates generally to pressure transducers. In particular, the present disclosure relates to piezoelectric pressure sensors that are suitable for applications relating to oil/gas industry.

Piezoelectric pressure transducers have a crystal resonator located inside a housing with electrodes. Environmental pressure and temperature are transmitted to the resonator, via the housing, and changes in the resonator are sensed and used to interpret the pressure and/or temperature. U.S. Pat. No. 3,617,780 discloses one example of pressure transducer having a quartz crystal resonator with single-mode oscillation. The quartz resonator is affected by both temperature and pressure such that some devices may not be suitable for use in environments where both temperature and pressure vary.

Some examples of pressure transducers having a quartz dual mode resonator are disclosed in the U.S. Pat. Nos. 4,419,600, 4,547,691 and 5,394,345, which are incorporated herein by reference in its entirety. In the dual-mode resonator, B-mode vibration is primarily only responsive to temperature whereas C-mode vibration is responsive to both temperature and pressure. Thus, by noting the change in frequency in both modes, temperature and pressure can be measured simultaneously.

Many advances in the science of quartz pressure/temperature transducers have been made in connection with oil/gas field applications. Transient or dynamic pressure measurements are routinely employed in the estimation of formation permeability, reservoir pressure, formation continuity, and reservoir boundaries. The pressures encountered during such the estimation can be greater than 20,000 psi. While making measurements, the transducers can be subjected to temperatures of approximately 175° C. or more over. In addition, a subterranean tool with a pressure transducer is connected to equipment on the ground surface via a telecommunication cable and operated under the ground in relatively long operation time. In such oil/gas field applications, there is a need for improved pressure transducers that are capable of measuring pressure more stably and accurately in high temperature and pressure environment.

SUMMARY OF THE DISCLOSURE

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect of the present disclosures, a pressure transducer comprises a housing including a body section and at least one end cap at one end of the body section, which is made of piezoelectric crystal, and a piezoelectric resonator in the housing. The body section and the end cap are bonded by an atomic diffusion bonding method.

In the transducer of the disclosure herein, the piezoelectric crystal may be quartz crystal, and each of the body section and the end cap may be formed by cutting from a same piezoelectric crystal block. In some cases, the body section and the end cap may be bonded by the atomic diffusion bonding method via an electrically conductive layer. The conductive layer may be used for a connection line between the resonator and an outer surface of the body section. The conductive layer may be made of metal material of at least one of Au, Ta, Ti and Cr, and also may have a thickness of a few dozen nm or more.

In one embodiment of the transducer disclosed herein, the resonator may be configured or designed for vibrating in dual modes of fast and slow thickness-shear vibrations. In another embodiment of the transducer disclosed herein, the body section may be a cylindrical body section; and the resonator may be formed with an internal element extending in a plane parallel to the longitudinal direction of the body section and the internal element may be connected to the internal surface of the body section. The at least one end cap may be a pair of end caps at opposite ends of the body section.

In yet another embodiment of the transducer disclosed herein, the body section may be a cylindrical body section; the resonator may be located in a radial plane within the housing, and the resonator may comprise a peripheral portion sandwiched between end caps of the housing. In yet another embodiment of the transducer disclosed herein, the body section may be a cylindrical body section; and the resonator having a generally H-shape in cross section may be formed with a discoid element connected to the internal surface of the body section. The at least one end cap may be a pair of end caps at opposite ends of the body section.

In another aspect of the present disclosures, a tool for pressure measurement comprises a pressure transducer and at least one oscillator circuit coupled to the pressure transducer. The pressure transducer comprises a housing including a body section and at least one end cap at one end of the body section, which is made of piezoelectric crystal and a piezoelectric resonator in the housing. The body section and the end cap are bonded by an atomic diffusion bonding method. In the tool of the disclosure herein, the piezoelectric crystal may be quartz crystal. The tool may comprise a temperature sensor disposed on or near an outer surface of the pressure transducer.

In yet another aspect of the present disclosures, a method for fabricating a pressure transducer comprises forming separately a body section and at least one end cap of a housing, forming a piezoelectric resonator in the housing, depositing electrically conductive material on the body section, and bonding the body section and the end cap by an atomic diffusion bonding method. The piezoelectric crystal may be quartz crystal and each of the body section and the end cap may be formed by cutting from a same piezoelectric crystal block. The body section and the end cap may be bonded by the atomic diffusion bonding method via an electrically conductive layer.

Advantages and novel features of the disclosures will be set forth in the description which follows or may be learned by those skilled in the art through reading the materials herein.

BRIEF DESCRIPTION OF THE DRAWINGS

Embodiments of a downhole apparatus and components thereof according to the disclosures herein are described with reference to the following figures. The same numbers are used throughout the figures to reference like features and components.

DETAILED DESCRIPTION

Illustrative embodiments and aspects of the present disclosure are described below. In the interest of clarity, not all features of an actual implementation are described in the specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such development effort might be complex and time-consuming, but would nevertheless be a routine undertaking for those of ordinary skill in the art having benefit of the disclosure herein.

Reference throughout the specification to "one embodiment," "an embodiment," "some embodiments," "one aspect," "an aspect," or "some aspects" means that a particular feature, structure, method, or characteristic described in connection with the embodiment or aspect is included in at least one embodiment of the present disclosure. Thus, the appearance of the phrases "in one embodiment" or "in an embodiment" or "in some embodiments" in various places throughout the specification are not necessarily all referring to the same embodiment. Furthermore, the particular features, structures, methods, or characteristics may be combined in any suitable manner in one or more embodiments. The words "including" and "having" shall have the same meaning as the word "comprising."

As used throughout the specification and claims, the term "downhole" refers to a subterranean environment, particularly in a wellbore. "Downhole tool" is used broadly to mean any tool used in a subterranean environment including, but not limited to, a logging tool, an imaging tool, an acoustic tool, a permanent monitoring tool, and a combination tool.

The signal processing systems herein may be incorporated in tool systems such as wireline logging tools, measurement-while-drilling and logging-while-drilling tools, permanent monitoring systems, sondes, among others. For purposes of this disclosure, when any one of the terms wireline, cable line, slickline or coiled tubing or conveyance is used it is understood that any of the referenced deployment means, or any other suitable equivalent means, may be used with the present disclosure without departing from the spirit and scope of the present disclosure.

Moreover, inventive aspects lie in less than all features of a single disclosed embodiment. Thus, the claims following the Detailed Description are hereby expressly incorporated into this Detailed Description, with each claim standing on its own as a separate embodiment.

Various embodiments incorporating the methods and techniques of this disclosure follow an integrated approach using conventional sonic, ultrasonic and borehole seismic to enable various kinds of measurements such as an evaluation of cement in a wellbore.

Figure 1:
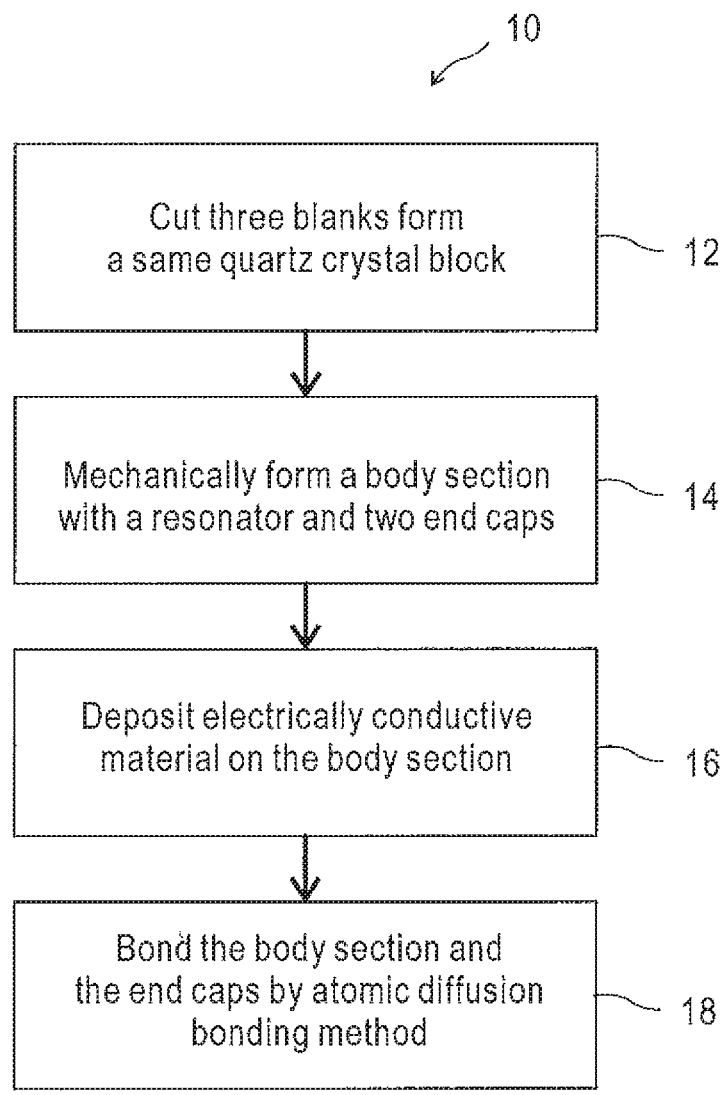
FIG. 1 is a flowchart of one example of a method for fabricating a pressure transducer according to the disclosure herein.

FIG. 1 is a flowchart of one example of a method 10 for fabricating a pressure transducer according to the disclosure herein. In this example of method 10, three cubic or blanks for a body member and two end caps are cut from a same piezoelectric crystal block such as a quartz block as indicated by block 12. The piezoelectric crystal may be $LiNbO_3$ (Lithium Niobate) crystal, or Langasite-type single crystal such as $La_3Ga_5SiO_{14}$ (Langasite), $La_3Ta_{0.5}Ga_{5.5}O_{14}$ (Langatate) or $La_3Ga_{5.5}N_{0.5}O_{14}$ (Langanite) crystal as described in U.S. Pat. No. 8,136,406 which is incorporated herein by reference in its entirety.

Piezoelectric crystal for a resonator used in embodiments herein comprises single rotation cut piezoelectric crystal such as X cut crystal and Y cut crystal, and double rotation cut piezoelectric crystal which is doubly rotated with respect to angles of $\varphi$(phi) and $\theta$(theta). The crystalline orientations of doubly-rotated resonators follow the Standard on Piezoelectric Crystals, 1949, published in the Proceedings of the Institute of Radio Engineers, New York, December, 1949.

In general, there are three modes of acoustic waves propagating in a crystal solid. One is the fastest compressional wave and the others are the fast shear wave and the slow shear wave. When the three modes of acoustic waves propagate in a resonator such as a discoid crystal, a plurality of vibrations such as compressional vibrations, fast and slow thickness-shear vibrations are generated as standing waves in the resonator. In the embodiments herein, the resonator may be configured or designed for vibrating in dual modes of fast and slow thickness-shear vibrations at different frequencies by cutting the above-mentioned piezoelectric crystal such as quartz single crystal along a specific plane oriented at the angles of $\varphi$(phi) and $\theta$(theta). Both modes of the fast and slow thickness-shear vibrations are generally more or less sensitive to stress and temperature but each has different sensitivities of stress and temperature from each other. The crystal orientation of the resonator may be selected so that one mode is more sensitive to stress and less sensitive to temperature than the other.

Referring back to FIG. 1, the three blanks are mechanically worked to form a body member with a resonator in the body member and two end caps as indicated by block 14. Electrically conductive material such as metal material of at least one of Au, Ta, Ti, and Cr is deposited on predetermined surface areas of the body section by a vacuum deposition method, a sputtering method, or the like, as indicated by block 16. The deposited films of conductive material function as a connection line between the resonator and outer surfaces of the body section. The conductive material is also deposited on two end surfaces of the body section to be bonded with the end caps by a predetermined thickness (for example, a few dozen nm). The deposited films of conductive material on the end surfaces are functioned as bonding layers of atomic diffusion bonding between the body section and the end caps. Finally, the body section and the end caps are bonded by an atomic diffusion bonding method without conventional glass frit as indicated by block 18.

The atomic diffusion bonding is a bonding technique in which a microcrystalline film is formed on the surface of two bonding material/member in a vacuum or atmospheric pressure, as described in Japanese Patent publication Nos. 2010-46696, 2011-235300 and 2012-223792. Based on the film material, the two surfaces can be bonded together without the use of adhesives, heat, or pressure. Some applications of the atomic diffusion bonding are disclosed in U.S. Pat. Nos. 9,151,960, 9,209,781, and 9,257,619, and U.S. Patent Application Publication No. 2016/0093773, which are incorporated herein by reference in its entirety. By applying the atomic diffusion bonding to the foregoing bonding between the body section and the end caps without glass frit, the body section and the end caps can be bonded atomically with strong bonding force via the conductive material such as metal material. Accordingly, it can be provided pressure transducers capable of measuring pressure more stably and accurately in high temperature and pressure environment.

Figure 2:
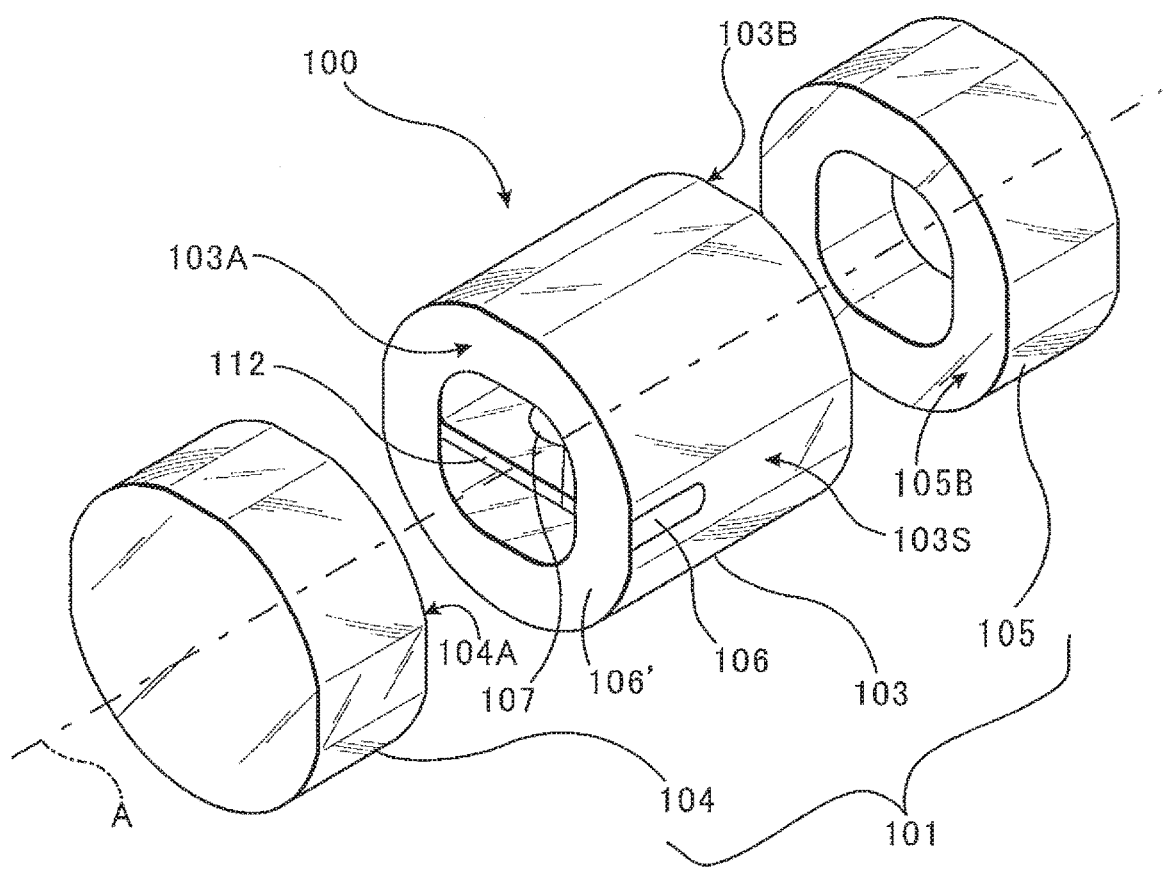
FIG. 2 is an exploded perspective view of one example of a pressure transducer according to the disclosure herein.

Referring now to FIG. 2, a pressure transducer 100 according to one embodiment of the present disclosure comprises a housing 101 and a piezoelectric resonator 112 in the housing 101. This design of pressure transducer 100 is suitable for use of the dual mode oscillation in the resonator 112. The housing 101 includes a cylindrical body section 103 and a pair of end caps 104 and 105 at opposite ends of the body section 103. The resonator 112 is formed with an internal element extending in a plane parallel to the longitudinal direction (axis A in FIG. 2) of the body section 103, the internal element being connected to the internal surface of the body section 103.

The assembly of the body section 103 and the resonator 112 is of unit construction cut in the same crystal block of the aforementioned piezoelectric crystal such as quartz. This structure is designed so that the thickness shear vibration mode in the direction parallel to the cylinder body axis, which is less sensitive to stress, is free from stress propagation from the outer sensor body by disconnecting one pair of the resonator edge from the sensor body. A pair of output transmission lines 106, 108 extending from electrodes 107 on both surfaces of the resonator 112 is fabricated on opposite side faces 103S of the body section 103 by depositing electrically conductive material. The conductive material 106', 108' such as metal material is also deposited end faces 103A and 103B of the body section 103 for the foregoing atomic diffusion bonding method.

Figure 3:
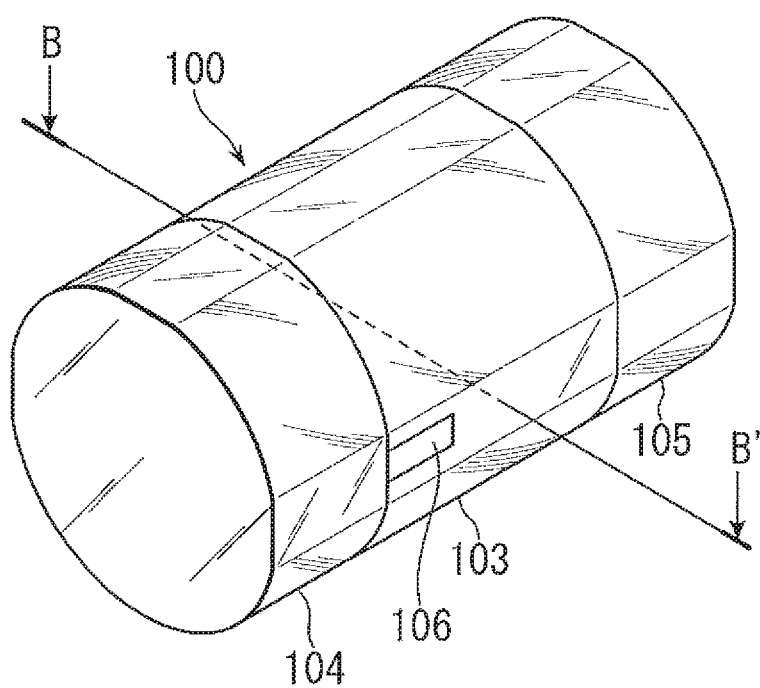
FIG. 3 is a perspective view of the pressure transducer after assembling.
Figure 4A:
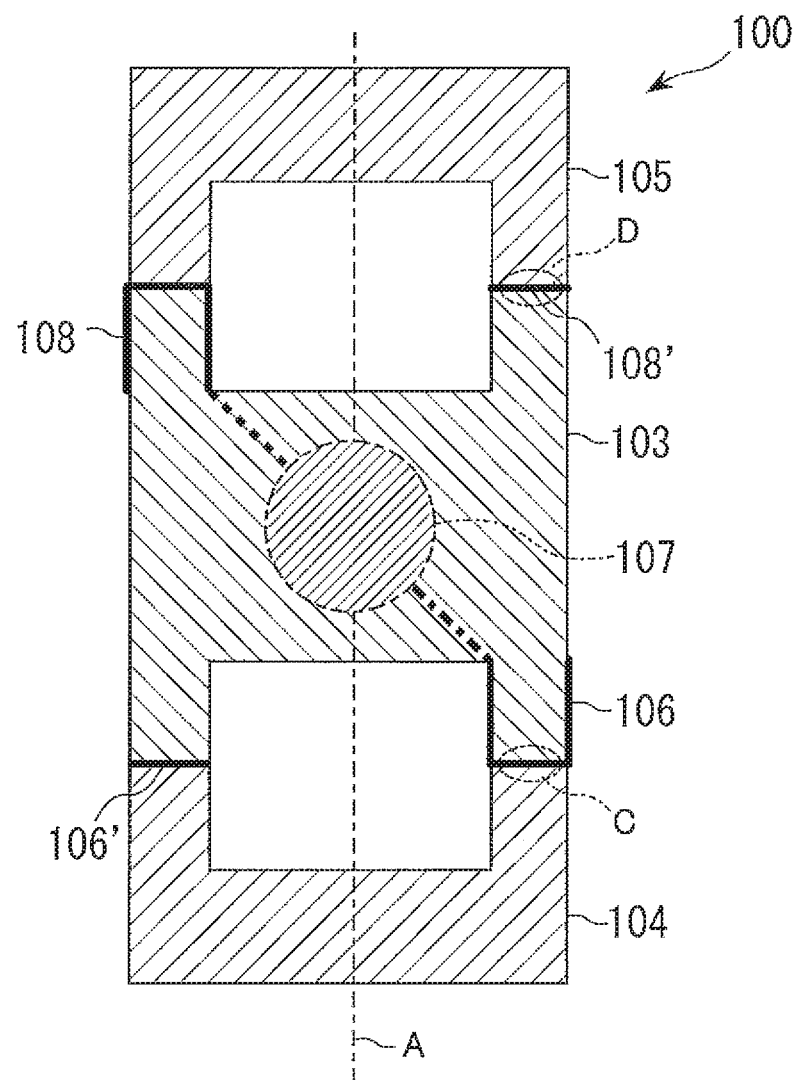
FIGS. 4A-4C are cross sectional views of the pressure transducer.
Figure 4B:
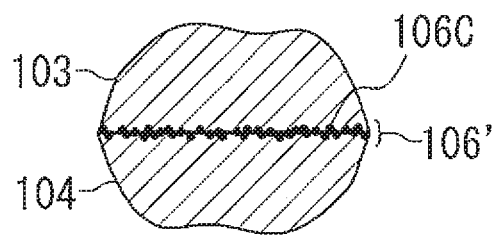
Figure 4C:
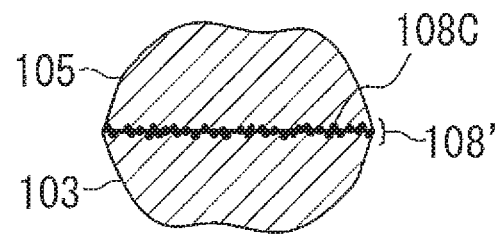

FIG. 3 is a perspective view of the pressure transducer after assembling. FIG. 4A is a cross sectional view of the transducer 100 in B-B' of FIG. 3, and FIGS. 4B and 4C are enlarged cross sectional views of areas C and D in FIG. 4A, respectively. In its assembled structure, the end caps 104 and 105 are strongly and stably bonded to the body section 103 via metal atoms 106C, 108C of the conductive metal layer 106', 108' by the atomic diffusion bonding method. Therefore, the transducer 100 has the end caps 104 and 105 which are applied on the end faces 103A and 103B of the body section 103 and can be secured thereto.

Figure 5:
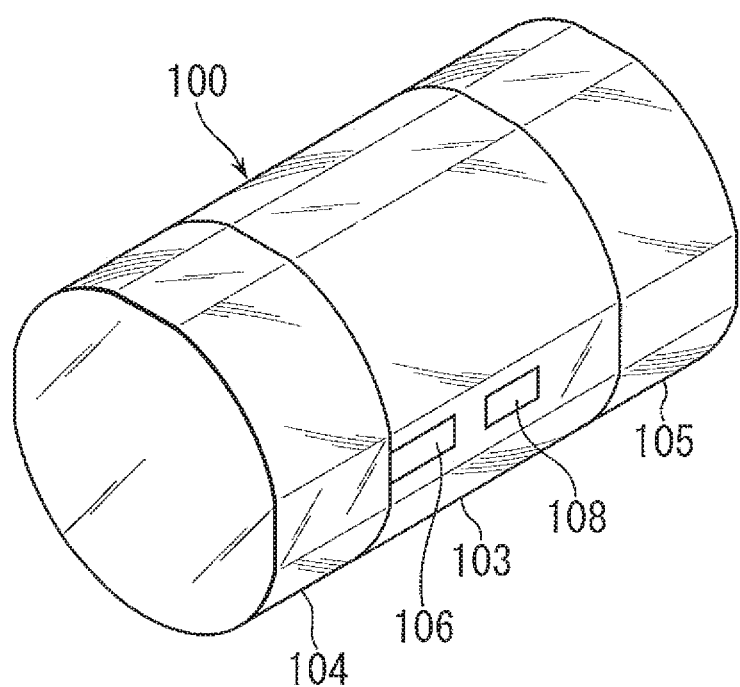
FIG. 5 is a perspective view of another example of a pressure transducer according to the disclosure herein.

The end caps 104 and 105 may be made of the foregoing piezoelectric crystal and preferably cut from piezoelectric crystal blocks adjacent to the crystal block for the body section 103. A thermometer (see, e.g., 108) may be attached, for example, on the outer side surface of the pressure transducer 100 as shown in FIG. 5. An RTD or any other type temperature measurement devices may be used as the thermometer. Other structures of pressure transducers described in U.S. Pat. No. 4,547,691 may be used instead of the structures in FIGS. 2, 3, 4 and 5. The U.S. Pat. No. 4,547,691 is incorporated herein by reference in its entirety.

Figure 6A:
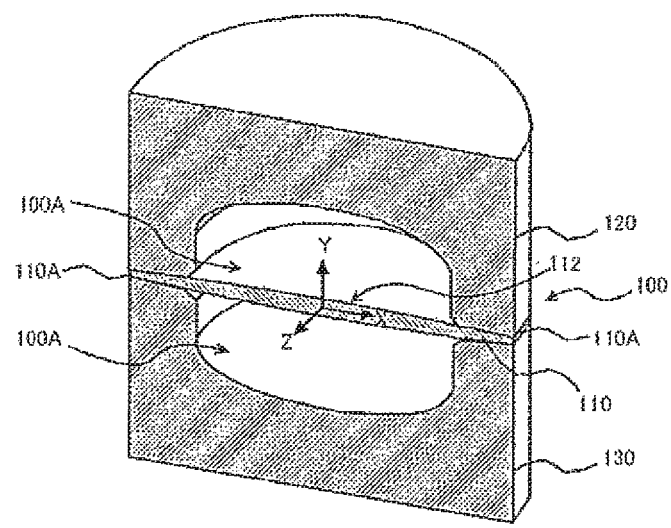
FIGS. 6A and 6B are cross sectional views of yet another example of a pressure transducer according to the disclosure herein.

FIG. 6A depicts a pressure transducer of according to another embodiment of the present disclosures herein. This design can be used for both of single mode and dual mode vibrations oscillation in the resonator. The pressure transducer 100 comprises an axisymmetric housing 120, 130 that is hollow inside and a bi-convex resonator 112 located in a radial plane within the housing. The resonator 112 includes a plate portion 110 with a circumferential edge surface 110A. The end caps 120, 130 are at opposite sides of the plate 110. The end caps 120, 130 are attached to the plate 110 so as to define a cavity 100A within which the resonator 112 is located.

Figure 6B:
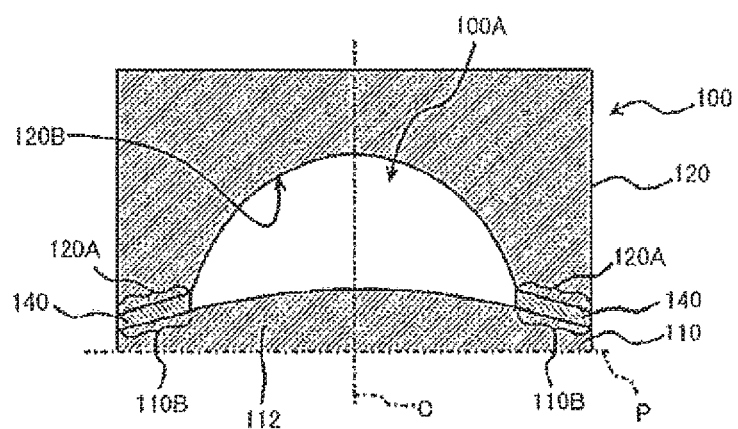

The plate 110 of the resonator 112 and the end caps 120, 130 may be formed as unitary axisymmetric structures from a crystal block of the aforementioned piezoelectric crystal such as quartz. Thus, the plate 110 and end caps 120, 130 are plane-symmetric about a center plane P and axisymmetric about C axis as shown in FIG. 6B. The end caps 120, 130 are attached and bonded to the ends 110B of plate 110 via conductive bonding interfaces 140 such as metal layers by the atomic diffusion bonding method. Each radius of curvature of bonded surfaces of end caps 120, 130 may be same as the radius of curvature of corresponding bonded surface of plate 110. For example, the radius of curvature of bonded surface 120A of end cap 120 may be same as the radius of curvature of bonded surface 110B of plate 110. The inner surface 120B of end cap 120 may be hemispherical or quasi-hemispherical in shape, as shown in FIG. 6B, with the same shape for end cap 130. In other embodiments, the inner surfaces of end caps 120, 130 may be elliptical in cross-sectional shape, that is, quadratic surface.

Figure 7:
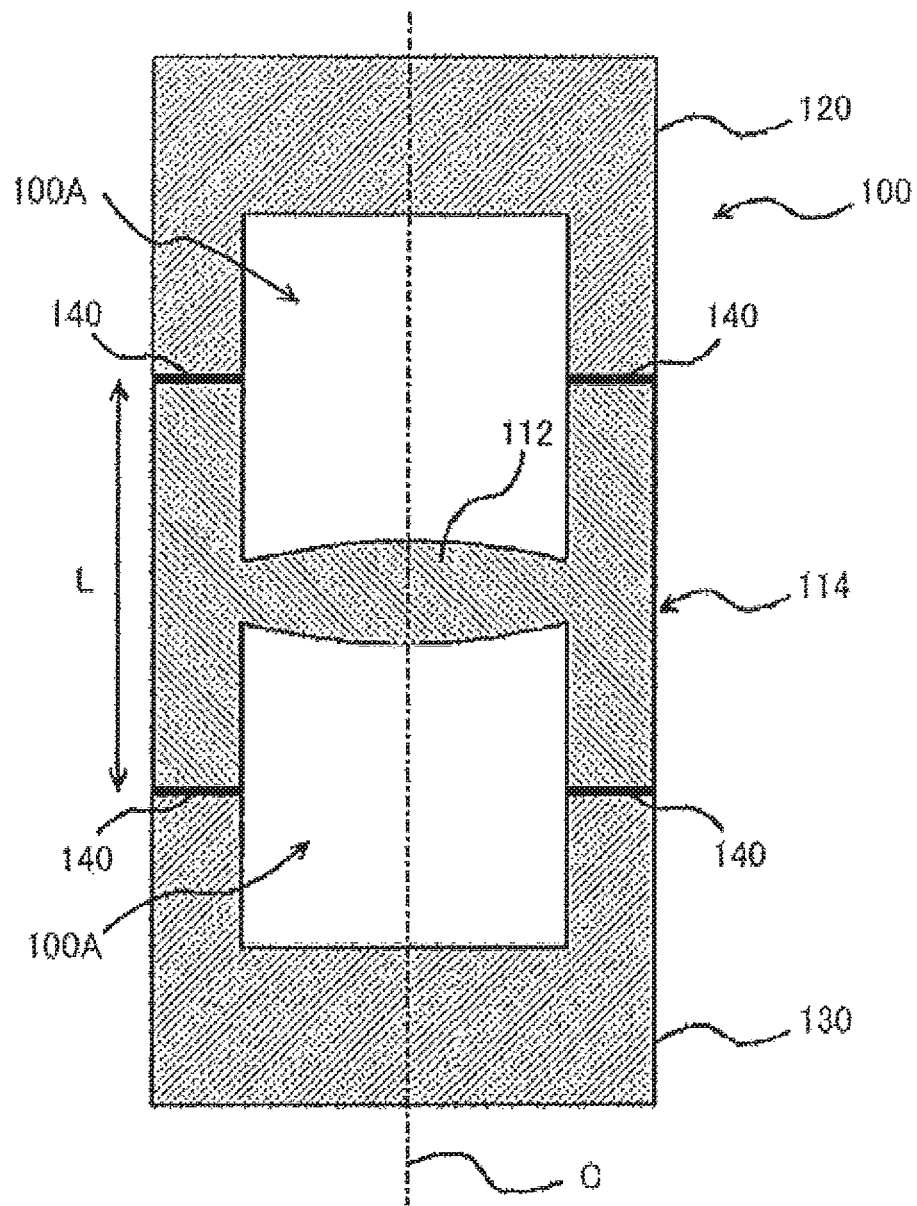
FIG. 7 shows yet another example of a pressure transducer according to the disclosure herein.

FIG. 7 shows yet another embodiment of a pressure transducer 100 comprising a resonator 112 having a body section 114 instead of the plate-like structure 110 described above. This design can be used for both of single mode and dual mode vibrations in the resonator. The body section 114 may have a cylindrical outer shape and be generally H-shaped in cross section. End caps 120, 130 are provided at ends of the body section 114, attached and bonded via bonding interfaces 140 such as metal layers by the atomic diffusion bonding method. The resonator 112 may have a bi-convex shaped resonating element located in a radial plane within the transducer 100. By adjusting length L of the extended portions of the body section 114, shear stress at the bonding interface 140 may be reduced so that more stable pressure measurements can be performed. It has been found that the substantially symmetrical structure of the bi-convex resonator makes that the transducer stronger than an asymmetrical structure so that pressure measurements in higher pressure ranges are possible.

In the above described embodiments in FIGS. 6A, 6B and 7, a thermometer may be attached, for example, on the outer surface of the pressure transducer 100. Other structures of pressure transducers described in U.S. Patent Application Publication No. 20090009036 and U.S. Pat. No. 6,111,340 may be used instead of the structures in FIGS. 6A, 6B and 7. The U.S. Patent Application Publication No. 20090009036 and the U.S. Pat. No. 6,111,340 are incorporated herein by reference in their entirety.

FIGS. 8A-8E show some examples of cross sectional shapes for resonators. Electrodes 150, 160 are provided on opposite surfaces in central portions of the plate 110 by conventional methods, such as vacuum evaporation deposition and sputtering. The electrode material is typically gold where an intermediate layer of chromium may be used to inhibit migration of gold into the piezoelectric crystal material. Thickness of the electrodes 150, 160 may be in the order of a few 100 Angstrom. The resonator 112 is formed in the portion between the electrodes 150, 160.

Figure 8A:
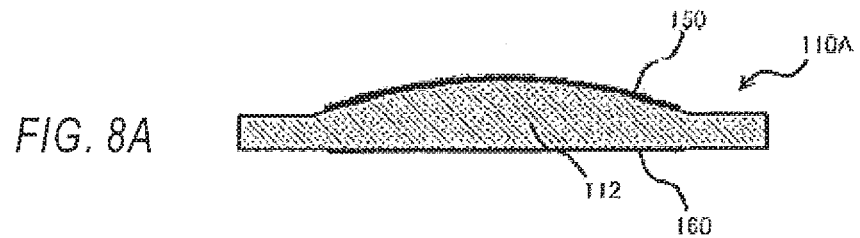
FIGS. 8A-8E show examples of cross sectional shapes of exemplary resonator according to the disclosure herein.
Figure 8B:
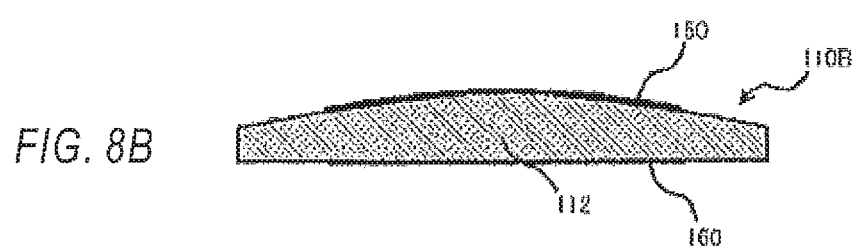
Figure 8C:
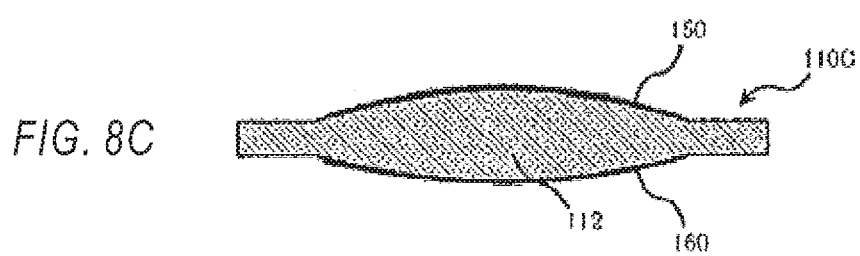
Figure 8D:
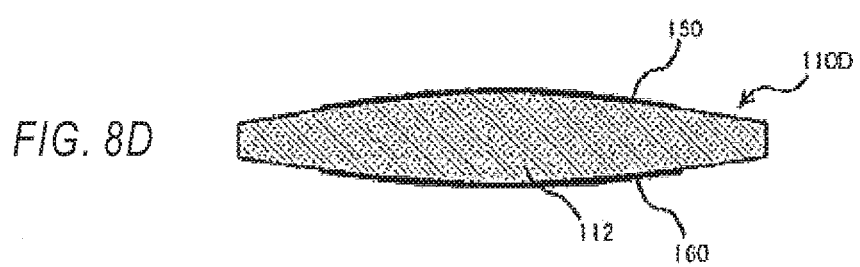
Figure 8E:
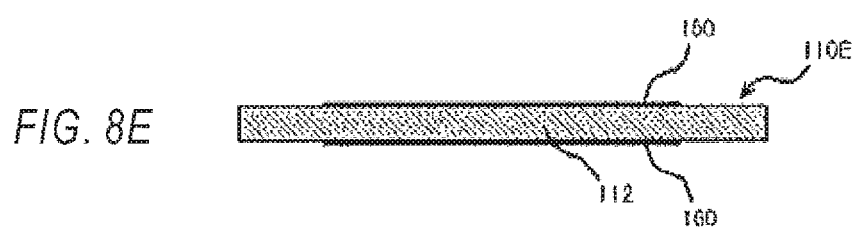

One shape of the resonator 112 is plano-convex as shown in FIGS. 8A and 8B. By using the plano-convex resonator, the energy of thickness vibrations can be trapped in the resonator 112 so as to reduce mounting losses and possible reflections of anharmonic overtones from the electrode and plate boundaries. In other words, the plano-convex resonator reduces undesired modes of vibration and confines resonant vibration energy as much as possible for a high Q-value. Other shapes of the resonator may also be adopted, such as a bi-convex resonator, as shown in FIGS. 8C and 8D, or flat resonator, as shown in FIG. 8E. In plano-convex and bi-convex resonators, the circumferential end portion surrounding the resonating element 112 of the plate 110 may be flat, as shown in FIGS. 8A and 8C, so that good sealing may be obtained between the plate 110 and end caps 120, 130 without having to shape the end surfaces of the end caps 120, 130.

Figure 9:
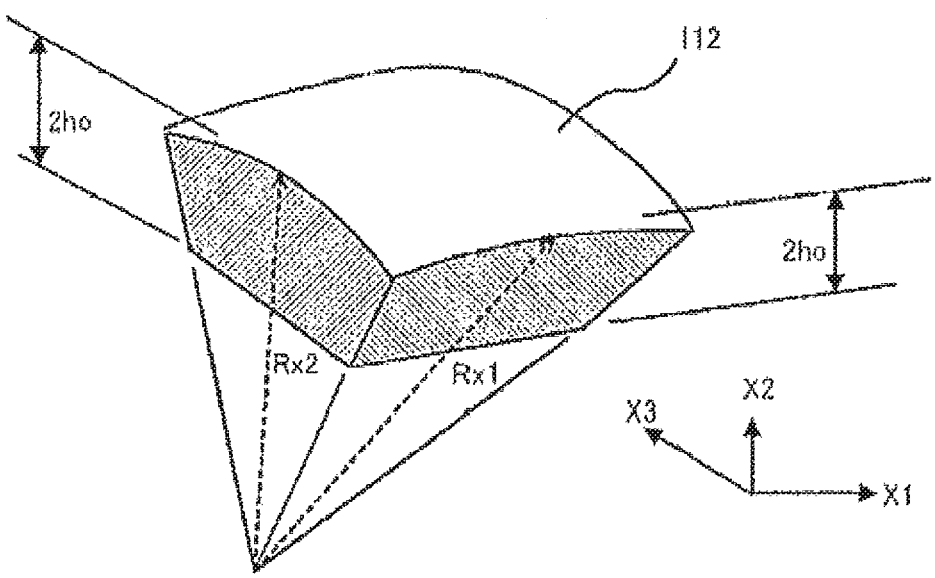
FIG. 9 is a schematic diagram of one non-spherically contoured plano-convex resonator.

By adjusting curvature of the convex surface, it is possible to reduce reflections of anharmonic overtones from the electrode edges and increase the frequency separation between the mode of interest and unwanted mode. The convex surface of the resonator 112 may have different radii of curvature along mutually crossing directions that are designed as X and Z directions in FIG. 6A. Referring to FIG. 9, for example, the radii of curvature $R_{X1}$, $R_{X3}$ along the X1 and X3 directions on the resonator surface 112 may be adjusted. By using the non-spherically contoured plano-convex resonator, having different radii of curvature along mutually crossing directions, the excitation of certain anharmonic overtones can be suppressed.

Figure 10:
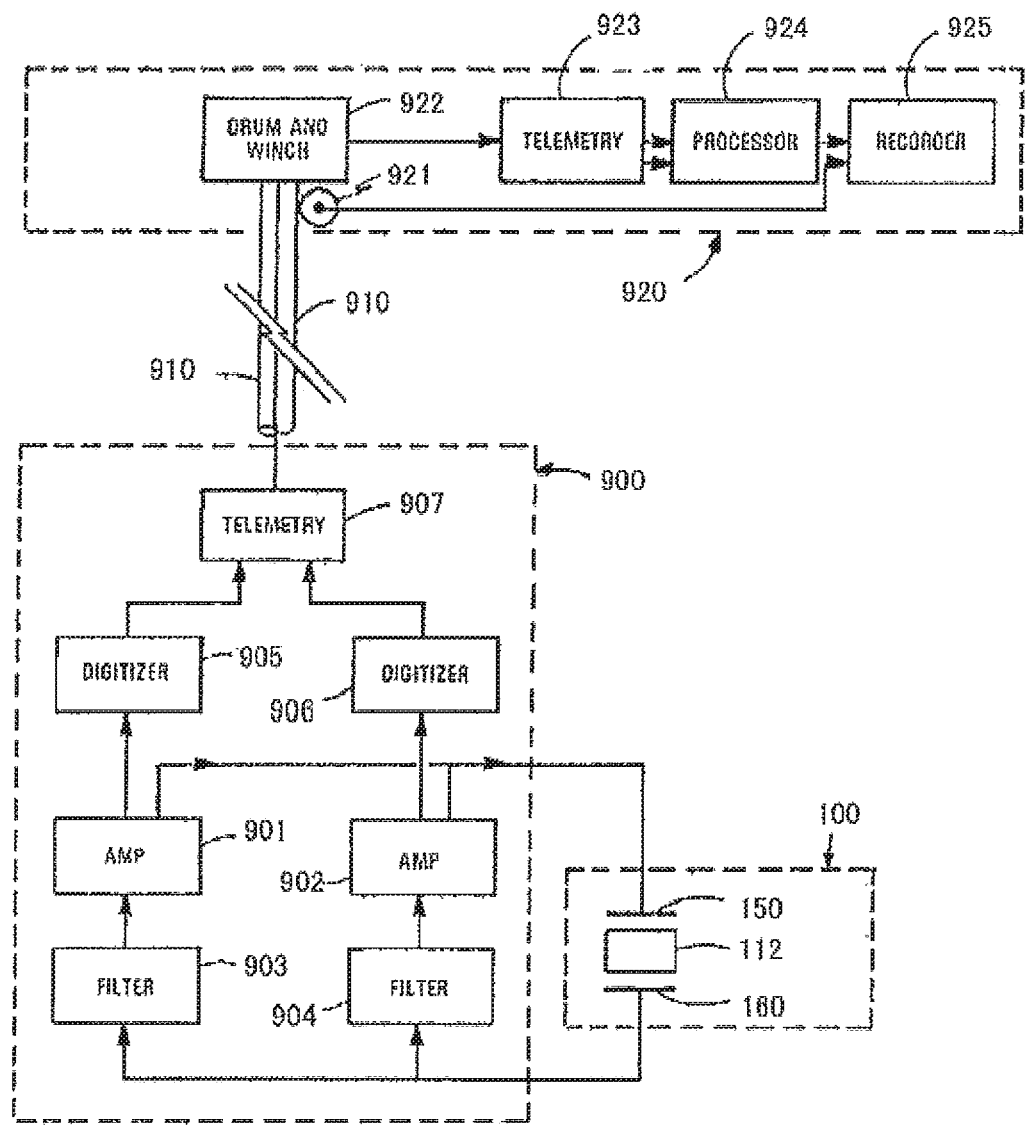
FIG. 10 is a schematic diagram of one example of an apparatus for measuring pressures in a well passing through earth formations in accordance with the present disclosure.

FIG. 10 is a schematic representation of one precision pressure measurement system for use in the exploration and production of hydrocarbons. A pressure transducer 100 comprises a piezoelectric resonator 112 disposed between electrodes 150, 160. The pressure transducer 100 and associated downhole electronics 900 may be associated with, for example, a downhole tool to take formation fluid pressures. The resonator 112 may be configured to operate in dual modes of vibration by application of an AC signal to electrodes 150, 160 by amplifiers 901 and 902. In the dual modes, one resonance frequency of output signal from amplifier 901 is attributed to the slow thickness-shear vibration in the crystal and the other resonance frequency of output signal from amplifier 902 is attributed to the fast thickness-shear vibration.

In general, the resonance frequency of each mode has different stress sensitivity and temperature sensitivity from each other. It is possible to choose a specific crystal orientation of the resonator 112 so that one mode is more stress sensitive and less temperature sensitive than the other. Utilizing those characteristics, it is possible to compensate temperature effect in pressure readings in one resonator.

Filters 903 and 904, having appropriate filter constants, such as poles and/or zeros relative to the frequencies modes, are provided to separate the energy from the variation in the two modes of the single pair of electrodes 150, 160. Amplifier 901 and filter 903 are configured to form one oscillator for oscillating at the resonance frequency corresponding to slow thickness-shear vibration of the resonator 112. Amplifier 902 and filter 904 are configured to form another oscillator for oscillating at the resonance frequency corresponding to the fast thickness-shear vibration.

The dual mode signals from amplifiers 901 and 902 are applied to respective digitizers 905 and 906. The digitized signals are applied to telemetry system 907 where they are multiplexed and transmitted to surface equipment 920, for example, via an armored cable 910.

For example, a logging device may be suspended in the borehole on the armored cable 910, the length of which substantially determines the relative depth of the logging device. The length of armored cable 910 is controlled by suitable means at the surface, such as a drum and winch mechanism 922. The armored cable 910 is rewound on the drum to raise the logging device toward the surface as measurements are taken. Depth measurements are provided by a measure wheel 921, or another suitable means for the depth measurements. Telemetry signals transmitted over armored cable 910 are supplied to telemetry system 923. The signals are de-multiplexed and digital frequency information for the two modes is supplied to processor 924. Processor 924 determines the temperature compensated pressure in accordance with the known methods, such as a curve fitting routine, or any other suitable method, and supplies this information to recorder 925 which, receiving depth information from measure wheel 921, records pressure as a function of depth.

In the aspects, surface temperature on the pressure transducer 100 may be measured for accurate thermal compensation of pressure values obtained by a pressure transducer, as described in U.S. Pat. No. 7,334,483, which is incorporated herein by reference in its entirety.

The surface temperature of a pressure gauge may be obtained with a thermometer. For example, a RTD type temperature measurement device may be used as the thermometer and may be attached to the peripheral surface of the resonator, as shown in FIG. 5. In this, a thin film Pt resistor may be deposited directly on the outer surface of the body section. The Pt resistor is also sensitive to pressure, but its pressure dependency is repeatable. Both pressure transducer and thermometer may be calibrated simultaneously to temperature and pressure measurements.

Although only a few example embodiments have been described in detail above, those skilled in the art will readily appreciate that many modifications are possible in the example embodiments without materially departing from this disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures.

Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

According to one embodiment of this disclosure, the comparatively less expensive materials can be modified to exhibit required properties of strength and corrosion resistance sufficient to either equal or exceed current requirements for service.

The preceding description has been presented only to illustrate and describe certain embodiments. It is not intended to be exhaustive or to limit the disclosures to any precise form disclosed. Many modifications and variations are possible in light of the above teaching. The embodiments and aspects were chosen and described in order to best explain principles of the disclosures and its practical applications. The preceding description is intended to enable others skilled in the art to best utilize the principles in various embodiments and aspects and with various modifications as are suited to the particular use contemplated. It is intended that the scope of the disclosures be defined by the following claims.

What is claimed is:

1. A pressure transducer comprising:
   a housing including a body section and at least one end cap at one end of the body section, the housing being made of piezoelectric crystal; and
   a piezoelectric resonator in the housing,
   wherein the body section and the end cap are bonded by an atomic diffusion bonding method via an electrically conductive layer.

2. The pressure transducer according to claim 1, wherein the piezoelectric crystal is quartz crystal.

3. The pressure transducer according to claim 1, wherein each of the body section and the end cap is formed by cutting from a same piezoelectric crystal block.

4. The pressure transducer according to claim 1, wherein the electrically conductive layer is used for a connection line between the resonator and an outer surface of the body section.

5. The pressure transducer according to claim 1, wherein the electrically conductive layer is made of metal material of at least one of Au, Ta, Ti and Cr.

6. The pressure transducer according to claim 1, wherein the electrically conductive layer has a thickness of a few dozen nm.

7. The pressure transducer according to claim 1, wherein the resonator is configured or designed for vibrating in dual modes of fast and slow thickness-shear vibrations.

8. The pressure transducer according to claim 1, wherein the body section is a cylindrical body section; and
   the resonator is formed with an internal element extending in a plane parallel to the longitudinal direction of the body section, the internal element being connected to an internal surface of the body section.

9. The pressure transducer according to claim 8, wherein the at least one end cap is a pair of end caps at opposite ends of the body section.

10. The pressure transducer according to claim 1, wherein:
    the body section is a cylindrical body section; and
    the resonator is located in a radial plane within the housing, the resonator comprising a peripheral portion sandwiched between end caps of the housing.

11. The pressure transducer according to claim 1, wherein:
    the body section is a cylindrical body section; and
    the resonator is formed with a discoid element connected to an internal surface of the body section, the resonator having a generally H-shape in cross section.

12. The pressure transducer according to claim 11, wherein the at least one end cap is a pair of end caps at opposite ends of the body section.

13. A tool for pressure measurement comprising:
    a pressure transducer and at least one oscillator circuit coupled to the pressure transducer, wherein
    the pressure transducer comprising:
       a housing including a body section and at least one end cap at one end of the body section, the housing being made of piezoelectric crystal; and
       a piezoelectric resonator in the housing,
       wherein the body section and the end cap are bonded by an atomic diffusion bonding method via an electrically conductive layer.

14. The tool according to claim 13, wherein the piezoelectric crystal is quartz crystal.

15. The tool according to claim 13, further comprising a temperature sensor disposed on or near an outer surface of the pressure transducer.

16. A method for fabricating a pressure transducer, comprising:
    forming separately a body section and at least one end cap of a housing;
    forming a piezoelectric resonator in the housing;
    depositing electrically conductive material on the body section; and
    bonding the body section and the end cap by an atomic diffusion bonding method via an electrically conductive layer.

17. The method according to claim 16, wherein the piezoelectric resonator is quartz crystal.

18. The method according to claim 16, wherein each of the body section and the end cap is formed by cutting from a same piezoelectric crystal block.

* * * * *